(12) United States Patent
Hellot

(10) Patent No.: US 9,550,468 B2
(45) Date of Patent: Jan. 24, 2017

(54) AIRBAG MODULE WITH A COVER BEARING A MANUFACTURER EMBLEM

(71) Applicant: Autoliv Development AB, Vårgårda (SE)

(72) Inventor: Laurent Hellot, La Feuillie (FR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 26 days.

(21) Appl. No.: 14/442,506

(22) PCT Filed: Nov. 6, 2013

(86) PCT No.: PCT/EP2013/073104
§ 371 (c)(1),
(2) Date: May 13, 2015

(87) PCT Pub. No.: WO2014/075961
PCT Pub. Date: May 22, 2014

(65) Prior Publication Data
US 2016/0272143 A1 Sep. 22, 2016

(30) Foreign Application Priority Data
Nov. 15, 2012 (DE) .......................... 10 2012 110 990

(51) Int. Cl.
*B60R 21/216* (2011.01)
*B60R 21/215* (2011.01)
(Continued)

(52) U.S. Cl.
CPC ........... *B60R 21/215* (2013.01); *B60R 21/216* (2013.01); *B60R 21/217* (2013.01); *B60R 21/237* (2013.01); *B60R 2021/21543* (2013.01)

(58) Field of Classification Search
CPC .... B60R 21/215; B60R 21/217; B60R 21/237; B60R 2021/21543
See application file for complete search history.

(56) References Cited

U.S. PATENT DOCUMENTS 5,613,701 A * 3/1997 Bentley ................. B60R 21/215
280/728.2
5,647,607 A * 7/1997 Bolieau ................. B60R 21/216
280/728.2
(Continued)

FOREIGN PATENT DOCUMENTS

DE 195 48 996 C1 4/1997
DE 196 17 758 C1 9/1997
(Continued)

OTHER PUBLICATIONS

PCT International Search Report—Dec. 2, 2013.
German Examination Report—Jul. 17, 2013.

*Primary Examiner* — Faye M Fleming
(74) *Attorney, Agent, or Firm* — Brinks Gilson & Lione

(57) ABSTRACT

An airbag module (10) with a housing (11) accommodating a gas generator (12) and a folded airbag (13) whose deployment opening (14) is closed before activation of the airbag (10) by a cover (15) fixed on the housing (11) by at least one predetermined breaking point (18) and to secure the opened cover (15) on the housing (11). An arrester strap (20) is positioned in a displaceable manner between the cover (15) and the housing (11). The cover (15) bearing a manufacturer emblem (17) on its exterior is secured on the housing (11) by means of a hinge (19) and the arrester strap (20) is attached by its one end (22) to a part affixed to the housing and encloses at least an area of the cover (15) or the manufacturer emblem (17) in a loop (27).

12 Claims, 1 Drawing Sheet

(51) Int. Cl.
 *B60R 21/217* (2011.01)
 *B60R 21/237* (2006.01)

(56) References Cited

U.S. PATENT DOCUMENTS

| | | | | |
|---|---|---|---|---|
| 5,651,562 | A * | 7/1997 | Hagen | B60R 21/215 280/728.2 |
| 5,964,478 | A * | 10/1999 | Stanley | B60R 21/01566 280/735 |
| 7,029,027 | B2 | 4/2006 | Gray et al. | |
| 2001/0009328 | A1 * | 7/2001 | Derrick | B60R 21/216 280/743.2 |
| 2011/0109067 | A1 * | 5/2011 | Le Hoang | B60R 21/215 280/728.3 |
| 2012/0032467 | A1 * | 2/2012 | Ory | B60R 21/205 296/72 |
| 2012/0126514 | A1 * | 5/2012 | Choi | B60R 21/215 280/728.3 |

FOREIGN PATENT DOCUMENTS

| | | |
|---|---|---|
| DE | 199 29 762 A1 | 1/2000 |
| DE | 200 04 076 U1 | 7/2000 |
| DE | 200 80 100 U1 | 5/2002 |
| EP | 1 112 899 A2 | 7/2001 |
| EP | 1 091 865 B1 | 5/2002 |
| EP | 1 967 421 A1 | 9/2008 |

* cited by examiner

AIRBAG MODULE WITH A COVER BEARING A MANUFACTURER EMBLEM

CROSS REFERENCE TO RELATED APPLICATIONS

This application claims priority to German Patent Application No. 102012110990.7, filed on Nov. 15, 2012, and PCT International Patent Application No. PCT/EP2013/073104, filed on Nov. 6, 2013.

FIELD OF THE INVENTION

The invention relates to an airbag module with a housing accommodating a gas generator and a folded airbag whose deployment opening is closed before activation of the airbag by a cover fixed on the housing by means of at least one predetermined breaking point. To secure the opened cover on the housing an arrester strap is positioned in a displaceable manner between the cover and the housing.

BACKGROUND

An airbag module of a type related to the present invention is known from DE 196 17 758 C1. A deployment opening is thereby constructed in a covering forming a component part of the housing which is closed before activation of the airbag module by a cover formed therein. The cover is constructed as one-piece with the covering but is defined in its contour by the predetermined break point, so that the cover upon activation of the airbag module by the pressure of the inflating airbag is separated out of the covering and releases the deployment opening. In order that the vehicle passengers are thus not injured by the cover separated from the covering, the cover is fixed on the housing by means of an arrester strap which is secured on one end to the inside of the covering an on the other end to the inside of the housing.

To the extent that emblems of the manufacturer of the vehicle equipped with the airbag module are frequently attached to such covers of airbag modules, EP 1 091 865 B1 describes how to secure the manufacturer emblem to the cover with a clip in addition to an arrester strap whose one end is fixed on the cover and whose other end on the emblem.

The known securing of the cover by the arrester strap is associated with the disadvantage that especially with an increase of the weight of a cover by the emblem attached thereon, the simple fixing of an arrester strap on the cover is not secure enough to provide for a sufficiently safe attachment of the cover to the housing after activation of the airbag module.

The object of the invention therefore is to provide in an airbag module with the characteristic features generally described previously having a more secure attachment of the airbag cover on the airbag module housing after its release.

The attainment of the object including advantageous designs and embodiments is indicated from the contents of this description.

SUMMARY AND INTRODUCTORY DESCRIPTION OF THE INVENTION

The present invention is based on the idea that the cover bearing a manufacturer emblem on its exterior is secured on the housing by means of a hinge and the arrester strap is attached by its one end to a part affixed to the housing and encloses at least an area of the cover and/or the manufacturer emblem in a loop. The advantage associated with the invention is that by means of the loop-like enclosure of at least one area of the cover and/or the manufacturer emblem, the cover held in the arrester strap loop cannot loosen from the arrester strap even with a corresponding force or acceleration effect so that the securing of the cover and the manufacturer emblem to the airbag housing is improved.

In the first embodiment the invention provides that the arrester strap is fully displaceable within the interior of the housing and is secured by its one end to an interior part affixed to the housing. This can pertain, for example, to an interior area of a stud bolt attachment for the gas generator on the housing.

According to an alternative embodiment, the invention provides that the arrester strap with its one end secured on the exterior of the housing is guided through a housing opening into the interior of the housing.

According to another embodiment, the invention provides that the housing opening is so positioned in a side wall of the housing that the arrester strap guided through the housing opening is displaceable on the interior side of the hinge between the folded airbag and the hinge. Associated therewith is the additional advantage of a reinforcement of the hinge area and a protection of the hinge during activation of the airbag module against the unfolding airbag which thereby also presses against the hinge.

In an expedient manner the invention provides that the arrester strap is attached on both ends to the outside of the housing in a double-layer arrangement and is guided through the hinge, wherein inside the housing the two layers of the arrester strap form the loop enclosing the cover and wherein either both ends of the arrester strap are secured on a stud bolt of the gas generator protruding out of the housing, or a securing pin is attached on the exterior of the housing on which both ends of the arrester strap are attached.

To secure the cover to the arrester strap, according to one embodiment the invention provides that two slits positioned in the cover with a separation to each other and enclosing an area of the cover between them and running from the interior of the cover in the direction of its exterior are designed so as to accommodate the arrester strap guided there-through.

In a first embodiment of the invention it is possible to guide the arrester strap along the interior side of the cover and outward through a slit to form the loop which encloses the cover in a course between the cover and the manufacturer emblem and then to guide it back into the interior of the housing through the other slit.

In so far as the arrester strap is guided from the hinge of the cover to the interior of the cover, there is the associated particular advantage that the arrester strap improves the sliding of the airbag on the interior of the cover upon opening of the cover by the inflating airbag, since the corresponding friction is reduced.

Alternatively the invention provides that the arrester strap is guided along the interior side of the cover and is guided through the two slits and through an interior channel constructed in the cover running between the slits to form the loop.

In an alternative embodiment the invention provides that in the cover as well as in the manufacturer emblem two slits are positioned with a separation to each other and enclose an area of the cover as well as the manufacturer emblem between them and running flush from the interior of the cover in the direction of its exterior are constructed to accommodate the arrester strap guided there-through and the arrester strap is guided along the interior of the cover, and to form the loop is guided through both slits in the cover as well as the manufacturer emblem and through an interior channel constructed in the manufacturer emblem running between the slits. Associated herewith is the advantage that especially with large area and/or heavy manufacturer emblems the manufacturer emblem is likewise directly secured by the arrester strap.

BRIEF DESCRIPTION OF THE DRAWINGS

One embodiment of the invention is depicted in the drawings which are described hereinafter shown are.

CONTINUED DESCRIPTION OF THE INVENTION

Figure 1:
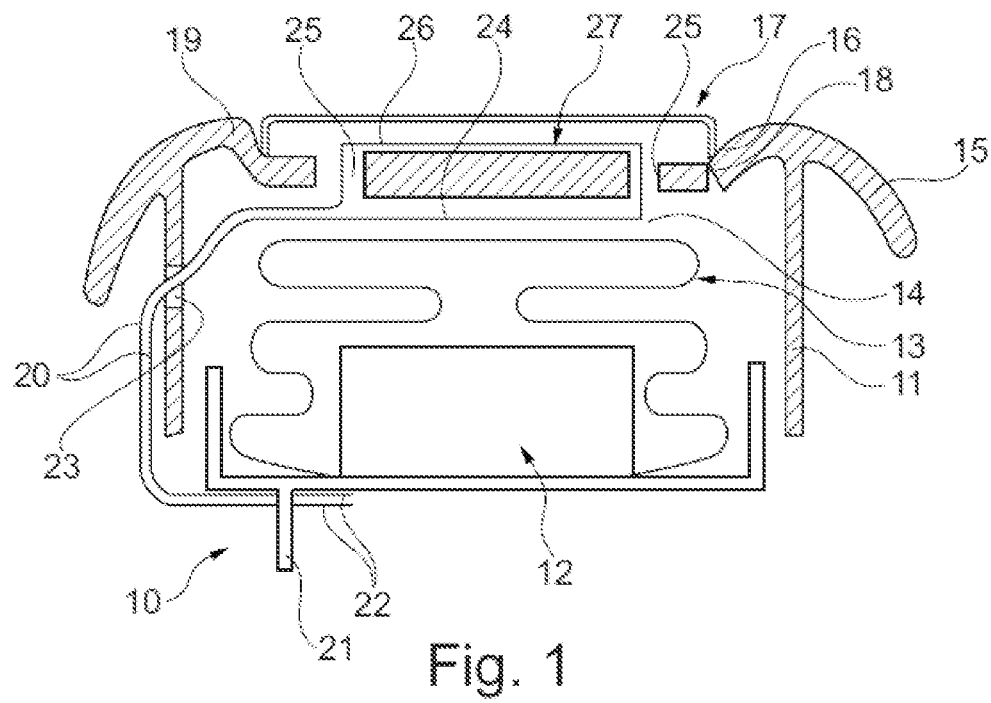
FIG. 1 is a schematic view of an airbag module with a cover bearing a manufacturer emblem before activation of the closed cover.

The airbag module 10 schematically depicted in FIG. 1 has a cup-shaped housing 11 on whose base a gas generator 12 is positioned. In addition a folded airbag 13 is housed in the interior of the housing 11 which upon activation of the airbag module 10 is inflated by the gas generator 12. A deployment opening 14 for the airbag 13 deploying during activation is constructed on the top side of the housing 11 opposite the gas generator 12, said opening is closed by the cover 15. In the depicted embodiment, the cover 15 is connected as one-piece with the exterior side wall of the housing 11, wherein a predetermined break point 18 is indicated on the right side of the cover 15; in the depiction it releases the cover upon an appropriate pressure exerted by the inflating airbag 13. A hinge 19 is constructed on the cover 15 opposite the predetermined break point 18 whose hinge function occurs because of a deformation of the corresponding cover area upon a swiveling of the cover 15 into the position shown in FIG. 2.

The cover 15 is provided with a depression 16 on its external top side in which a manufacturer emblem 17 is positioned which is permanently connected with the cover 15 in a non-depicted manner.

Figure 2:
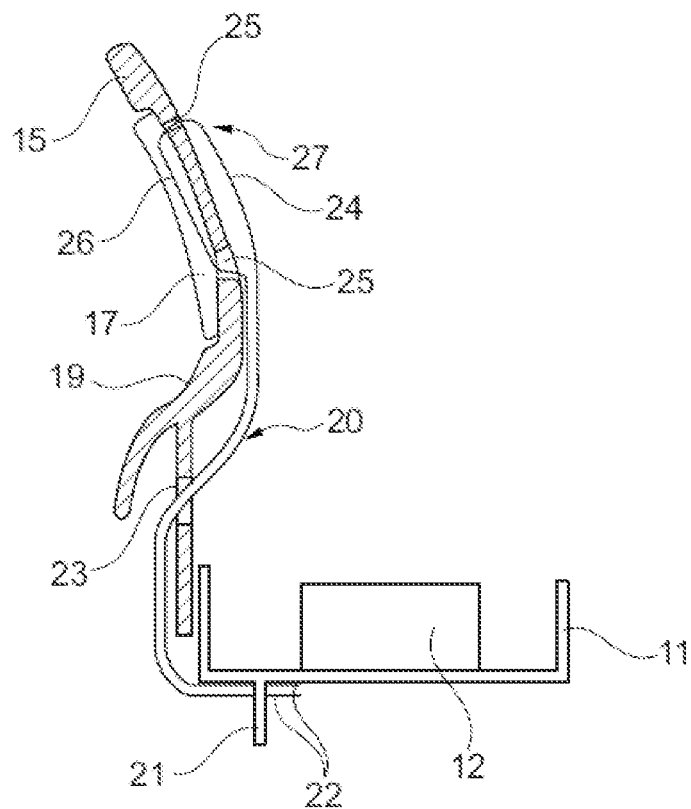
FIG. 2 shows an airbag module according to FIG. 1 after activation and opening of the cover.

To secure the cover 15 to the housing 11 after the swiveling of the cover 15 into the position shown in FIG. 2, an arrester strap 20 is provided and positioned so that both arrester strap ends 22 are attached on the exterior side of the housing 11 to a securing pin 21 placed in its base area. Accordingly, the double-layered arrester strap 20 leading away from the securing pin 21 is guided through a housing opening 23 constructed in the side wall of the housing 11 placed below the hinge 19 into the interior of the housing 11, and then runs in this double-layered arrangement between the hinge 19 and the folded airbag 13.

To construct a loop 27 of the arrester strap 20 enclosing at least a central area of the cover 15, two slits 25 are provided in the cover 15, said slits are arranged at a separation to each other, and enclose a central area of the cover 15 between them and are displaceable from the interior of the cover 15 in the direction of its exterior so as to accommodate the arrester strap 20 passing through said slit. With regard to the loop-like guide of the arrester strap 20, an interior arrester strap ply 24 is guided along the interior of the cover 15 and to form the loop 27 is guided outward through one of the slits 25; at the termination thereof the arrester strap 20 with its exterior arrester strap ply 26 encloses the area of the cover lying between the slits 25, such that the exterior arrester strap ply 26 is so guided outward between the cover 15 and the manufacturer emblem 17 and back through the other slit 25 into the interior of the housing 11. A loop-like enclosure of the central area of the cover 15 results because of the inner arrester strap ply 24 and the outer arrester strap ply 26, wherein there is a double-layered arrangement of the arrester strap outside the area of the cover 15 enclosed by the loop 27.

It is then evident that upon activation of the airbag module 10, the cover loosens at the predetermined break point 18 and swivels outward, wherein the hinge 19 constructed in the cover 15 is deformed. During this procedure the hinge 19 is protected by the double-layered arrester strap 20 running along it. In the swung-out state of the cover 15, the cover 15 is safely held by the loop 27 of the arrester strap enclosing it in the central area.

While the above description constitutes the preferred embodiment of the present invention, it will be appreciated that the invention is susceptible to modification, variation and change without departing from the proper scope and fair meaning of the accompanying claims.

The invention claimed is:

1. An airbag module comprising a housing accommodating a gas generator and a folded airbag whose deployment opening is closed before activation of the airbag by a cover fixed on the housing by at least one predetermined breaking point, and to secure the cover on the housing after the cover has opened an arrester strap is positioned in a displaceable manner between the cover and the housing, the arrester strap is formed of a length of strap material folded in a double layer arrangement to form two plies, each of which has a ply end, the arrester strap is attached by the two ply ends to an exterior side of the housing and is guided through a housing opening, wherein on the inside of the housing the two plies of the arrester strap form the loop enclosing the area of the cover, the cover bearing an emblem on its exterior and the cover is secured on the housing by a hinge and the arrester strap is attached by an end to a part affixed to the housing and the loop of the arrester strap wraps around at least an area of the cover.

2. The airbag module according to claim 1, wherein the arrester strap is fully displaceable within the interior of the housing and is secured by the one end to an interior part affixed to the housing.

3. The airbag module according to claim 1, wherein the arrester strap is attached by the two ply ends to an exterior side of the housing and is guided through a housing opening into the interior of the housing.

4. The airbag module according to claim 1, wherein the two ply ends of the arrester strap are attached to a stud bolt of the gas generator protruding from the housing.

5. The airbag module according to claim 1, wherein a securing pin is positioned on the exterior side of the housing to which both ply ends of the arrester strap are attached.

6. The airbag module according to claim 1, wherein the emblem is affixed to the cover.

7. An airbag module comprising a housing accommodating a gas generator and a folded airbag whose deployment opening is closed before activation of the airbag by a cover fixed on the housing by at least one predetermined breaking point, and to secure the cover on the housing after the cover has opened an arrester strap is positioned in a displaceable manner between the cover and the housing, wherein the arrester strap is attached by the one end to an exterior side of the housing and is guided through a housing opening into the interior of the housing, the cover bearing an emblem on its exterior and the cover is secured on the housing by a hinge and the arrester strap is attached by an end to a part affixed to the housing and a loop of the arrester strap wraps around at least an area of the cover, wherein the housing opening is a hole positioned in and extending through a side wall of the housing such that the arrester strap guided through the housing opening and is positioned on the interior of the hinge between the folded airbag and the hinge.

8. An airbag module comprising a housing accommodating a gas generator and a folded airbag whose deployment opening is closed before activation of the airbag by a cover fixed on the housing by at least one predetermined breaking point, and to secure the cover on the housing after the cover has opened an arrester strap is positioned in a displaceable manner between the cover and the housing, the arrester strap is formed of a length of strap material folded in a double layer arrangement to form two plies, each of which has a ply end, the arrester strap is attached by the two ply ends to an exterior side of the housing and is guided through a housing opening, wherein on the inside of the housing the two plies of the arrester strap form a loop enclosing the area of the cover, the cover bearing an emblem on its exterior and the cover is secured on the housing by a hinge and the arrester strap is attached by an end to a part affixed to the housing and the loop of the arrester strap wraps around at least an area of the cover; the airbag module further comprising two slits arranged at a separation to each other, enclose the area of the cover between them and are displaced from the interior of the cover in the direction of its exterior so as to accommodate the arrester strap loop passing through the slits.

9. The airbag module according to claim 8, wherein the arrester strap is guided along the interior side of the cover and is guided outward through a first of the slits to form the loop which encloses the area of the cover, one of the plies is positioned in a gap between the cover and the emblem and is guided back into the interior of the housing through a second of slits.

10. The airbag module according to claim 8, wherein the arrester strap is guided on the interior side of the cover and to form the loop and is guided through the two slits and through an interior channel constructed in the cover running between the slits.

11. The airbag module according to claim 8, wherein the cover as well as in the emblem form a separation to each other forming an interior channel and enclosing area portion of the cover the interior channel constructed to accept the arrester strap guided there-through and the arrester strap is guided along the interior of the cover and to form the loop is guided through both slits in the cover as well as the emblem.

12. The airbag module according to claim 8, wherein the emblem overlies and encloses the pair of slits.

* * * * *